3,317,503
PRODUCTION OF POLYBUTADIENE OF REDUCED TENDENCY TO COLD FLOW
Floyd E. Naylor, Bartlesville, Okla., assignor to Phillips Petroleum Company, a corporation of Delaware
No Drawing. Filed Mar. 25, 1963, Ser. No. 267,845
9 Claims. (Cl. 260—94.3)

This invention relates to polybutadiene. In another aspect, it relates to a process for producing a butadiene polymer having little, if any, tendency to cold flow, and to the butadiene polymer product so produced.

Widespread attention and commercial interest has been attracted in recent years in the field of rubbery polymers of butadiene. For example, polybutadiene containing a high percent, i.e. at least 80 percent, of cis-1,4-addition, has physical properties of such a nature that the polymer is suitable for a variety of uses for which conventional synthetic rubbers have heretofore been comparatively unsatisfactory. In particular, polybutadiene with 85 percent or higher cis-1,4-configuration is particularly suitable for the fabrication of heavy duty tires. Another butadiene polymer which has achieved considerable importance is that prepared by polymerizing 1,3-butadiene with an organolithium catalyst.

However, in the processing of these butadiene polymers, particularly in packaging, shipping and storing the same, a certain amount of difficulty has been encountered because of the tendency of the polymer to cold flow when in the unvulcanized state. For example, if cracks or punctures develop in the package used in storing the unvulcanized polymer, it will flow from the package with a resulting product loss or contamination and sticking together of stacked packages. Bales of the polymer product with high cold flow also tend to lose their shape. In order to prevent problems from arising due to cold flow, resort often has been made to special packaging of the polymer at considerable cost. While this property of cold flow generally does not detract from the desirable properties of the vulcanizates, it is desirable to eliminate the cold flow tendency as a convenience in storage, transportation and the like.

Accordingly, an object of this invention is to provide an improved butadiene polymer with little, if any, tendency to cold flow, particularly those polybutadienes having a high percentage of cis-1,4-addition and those produced by polymerization of 1,3-butadiene with organolithium catalysts. Another object is to provide a process for treating high molecular weight polybutadiene to prevent or reduce its normal tendency to cold flow. Other objects and advantages of this invention will become apparent to those skilled in the art from the following description and appended claims.

Briefly stated, the subject invention comprises adding to and admixing with the polymerization mixture, obtained by solution polymerization of 1,3-butadiene, a treating agent, such as an organoaluminum hydride, after the desired degree of conversion of the 1,3-butadiene monomer, and recovering the resulting butadiene polymer from the treated polymerization mixture. This butadiene polymer product will have little, if any, tendency to cold flow, which means greater ease of handling the product and lower packaging and shipping costs. The butadiene polymers that can be treated in this invention have ranalkylalkyl, aralkylcycloalkyl, alkarylcycloalkyl, cycloal- The treating agents used in this invention to prevent or reduce the normal tendency of polybutadiene to cold flow are organometals or organometal hydrides which can have the general formula $R_nMH_m$ where: R is a hydrocarbon radical selected from the group consisting of alkyl, aryl, cycloalkyl, and combinations thereof such as alkaryl, aralkyl, alkylcycloalkyl, arylcycloalkyl, cycloalkylaryl, cycloalkylalkyl, alkylcycloalkylaryl, arylcycloalkylalkyl, aralkylcycloalkyl, alkarylcycloalkyl, cycloalkylaralkyl, cycloalkylalkaryl, and the like, where each R can have from 1 to 20 carbon atoms, preferably from 1 to 10 carbon atoms; M is a metal from Group III–B of the Periodic System, Mellor's Modern Inorganic Chemistry, Parkes and Melor, Longmans, Green and Company (1939), p. 118, namely boron, aluminum, gallium, indium and thallium; H is hydrogen; n is an integer from 1 to 3, inclusive, m is an integer from 0 to 2, and the sum of n and m is equal to 3. Mixtures of 2 or more of these treating agents can also be used.

Representative treating agents coming within the scope of the general formula $R_nMH_m$ as defined above, and useful in the practice of this invention, include methylaluminum dihydride,
dimethylaluminum hydride,
diethylaluminum hydride,
n-butylaluminum dihydride,
ethylaluminum dihydride,
diisobutylaluminum hydride,
decylaluminum dihydride,
eicosylaluminum dihydride,
n-butylethylaluminum hydride,
cyclopentylaluminum dihydride,
cyclohexylaluminum dihydride,
dicyclooctylaluminum hydride,
cyclononadecylaluminum dihydride,
4-methylcyclohexylaluminum dihydride,
phenylaluminum dihydride,
3-propylphenylaluminum dihydride,
3-cyclohexylpropylaluminum dihydride,
di(4-cycloheptyldecyl)aluminum hydride,
3-phenylbutylaluminum dihydride,
alpha-naphthylaluminum dihydride,
dibenzylaluminum hydride,
2,4-diphenyloctylaluminum dihydride,
di-2-tolylaluminum hydride,
2-methylcyclopentylaluminum dihydride,
di(5-nonylcyclononyl)aluminum hydride,
2-phenylcyclopentylaluminum dihydride,
2,4-diphenylcyclooctylaluminum dihydride,
2,4-dibutylphenylaluminum dihydride,
di(2,4-dioctylphenyl)aluminum hydride,
4-cyclobutylphenylaluminum dihydride,
2,4-dicyclopentylphenylaluminum dihydride,
di(2,4-cyclooctylphenyl)aluminum hydride,
4-(3-methylcyclohexyl)phenylaluminum dihydride,
5-(2-phenylcyclohexyl)amylaluminum dihydride,
bis[3-(3-phenyl-n-butyl)cycloheptyl]aluminum hydride,
3-(3,4-dimethylphenyl)cyclooctylaluminum dihydride,
4-cyclohexylbenzylaluminum dihydride,
bis(5-cyclohexyl-3-tolyl)aluminum hydride,
trimethylaluminum,
triethylaluminum,
tri-n-butylaluminum,
triisobutylaluminum,
tri-n-hexylaluminum,
methyldiethylaluminum,
tri-tert-amylaluminum,
tri-n-decylaluminum,
tri-n-dodecylaluminum,
triphenylaluminum,
tri-alpha-naphthylaluminum,
tri-beta-naphthylaluminum,
diphenyl-alpha-naphthylaluminum,
tribenzylaluminum,
tri(2-phenylethyl)aluminum,
tri(6-phenylhexyl)aluminum,
tri-6(1-naphthyl)hexylaluminum, tri-9(2-naphthyl)nonylaluminum,
tri-2-tolylaluminum,
tri-4-tolylaluminum,
tri(2,4-dimethylphenyl)aluminum,
tri(3-ethylphenyl)aluminum,
tri(2,4-dimethyl-6-ethylphenyl)aluminum,
tri(4-n-butylphenyl)aluminum,
tri(2-n-hexylphenyl)aluminum,
tri(2,4,6-isobutylphenyl)aluminum,
tri(4-dodecylphenyl)aluminum,
tri(2-methyl-1-naphthyl)aluminum,
tri(2,4,5,7-tetraethyl-1-naphthyl)aluminum,
tri(4,5-dipentyl-2-naphthyl)aluminum,
tricyclohexylaluminum,
tricyclopentylaluminum,
methyldicyclohexylaluminum,
tri(3-pentadecyclcyclopentyl)aluminum,
tri(4-methylcyclohexyl)aluminum,
tri(2,4-diethylcyclohexyl)aluminum,
tri(3-isobutylcyclohexyl)aluminum,
tri(2,4,6-tri-n-propylcyclohexyl)aluminum,
tri(2-n-propylcyclopentyl)aluminum,
tri(2-cyclohexylethyl)aluminum,
tri(3-cyclopentylbutyl)aluminum,
tri(14-cyclohexyltetradecyl)aluminum,
tri(3-phenylcyclohexyl)aluminum,
tri(3-cyclohexylphenyl)aluminum,
tri[3-(4-ethylcyclohexyl)phenyl]aluminum,
tri[2-(2-phenylcyclohexyl)ethyl]aluminum,
tri[3-(3-tolyl)cyclopentyl]aluminum,
tri[10-(3-amylcyclooctyl)decyl]aluminum, and the like.

Corresponding organometal and organometal hydride compounds of boron, gallium, indium and thallium can also be employed, though such compounds are less effective and/or most costly to prepare than those of aluminum. Of the aluminum compounds, those where the R's are alkyl, especially the same alkyl, are preferred, particularly the dialkylaluminum hydrides.

In accordance with this invention, the treating agent is added to and admixed with the polymerization mixture when the desired conversion is obtained, e.g., usually at least 80 percent, preferably as much as 90 percent and higher. When such treating agent is present initially, i.e., at the onset of polymerization, it is not effective in reducing the normal tendency of the polybutadiene polymer to cold flow. The treating agent can be charged to the polymerization mixture as a solution in a hydrocarbon, preferably a hydrocarbon like or similar to the hydrocarbon diluent employed in the polymerization of the 1,3-butadiene. The treating agent is effective at whatever temperature is employed in the polymerization. However, in order to achieve an optimum reduction in or elimination of cold flow, elevated temperatures in the range of 40 to 300° F., preferably 75 to 200° F., will be suitable. The contact or treating time will be dependent to some extent upon the temperature employed, the particular treating agent used, and whether the operation is batch or continuous. A longer contact time generally will be required as the temperature is lowered. The contact time is usually in the range of 1 minute to 15 days, preferably in the range from 5 minutes to 30 hours. The amount of the treating agent employed can vary over a relatively wide range, but generally will be about 0.1 to 50 parts by weight per 100 parts of the polymer (phr.), preferably about 0.5 to 25 parts by weight per 100 parts of the polymer.

At the end of the contact or treating period, the polymer can be recovered by any conventional means. For example, the polymerization mixture can be treated with a shortstopping agent, such as water, alcohol, inorganic acids, rosin acids, hydroquinone, and the like, and the polymer can be coagulated with a suitable reagent, such as an alcohol, or the polymerization diluent can be removed by steam stripping. The improved polybutadiene product, having little, if any, tendency to cold flow, can then be compounded by any of the known methods such as have been used in the past for compounding natural rubber. Vulcanization agents, vulcanization accelerators, accelerator activators, reinforcing agents, antioxidants, and fillers can be employed in compounding the improved polybutadiene product of this invention.

The polymerization of 1,3-butadiene is preferably carried out in the presence of an inert hydrocarbon diluent which is liquid under the conditions of polymerization and is not deleterious to the catalyst system. The concentration of the butadiene in the diluent can vary and will be dependent upon such factors as the particular diluent used; generally, the concentration of the butadiene in the diluent will be about 8 to 15 weight percent. Representative examples of diluents which can be used include: aromatics such as benzene, toluene, xylene, ethylbenzene, and the like; straight or branched chain paraffins, preferably with up to 10 carbon atoms per molecule, such as propane, n-butane, n-pentane, isohexane, isooctane, n-decane, and the like; and cycloparaffins such as cyclopentane, cyclohexane, methylcyclohexane, and the like. Aromatic diluents are preferred because they apparently enhance the formation of the cis-1,4-structure. Mixtures of the above disclosed hydrocarbons can also be employed as diluents.

Many stereospecific catalysts (or catalyst systems) are known in the art for selectively converting 1,3-butadiene to a high percentage of cis-1,4-polybutadiene, and any of these can be used in this invention. It is usually preferred to employ a catalyst which is selected from the group consisting of (1) a catalyst comprising that obtained upon commingling an organometal compound having the formula $R'_mM'$, wherein $R'$ is alkyl, cycloalkyl, aryl, alkaryl, aralkyl, alkylcycloalkyl, arylcycloalkyl or cycloalkylalkyl, $M'$ is aluminum, mercury, zinc, beryllium, cadmium, magnesium, sodium or potassium, and $m$ is equal to the valence of the metal $M'$, and titanium tetraiodide, (2) a catalyst comprising an organometal compound having the formula $R'_nM''$, wherein $R'$ is an organo radical as defined above, $M''$ is aluminum, magnesium, lead, sodium or potassium, and $n$ is equal to the valence of the metal $M''$, titanium tetrachloride and titanium tetraiodide, (3) a catalyst comprising an organometal compound having the formula $R'_3Al$ or $R'_2Mg$, wherein $R'$ is an organo radical as defined above, a compound having the formula $TiX_a$, wherein X is chlorine or bromine and $a$ is an integer from 2 to 4, inclusive, and elemental iodine, (4) a catalyst comprising an organometal compound having the formula $R'_xM''$, wherein $R'$ is an organo radical as defined above, $M''$ is aluminum, gallium, indium or thallium, and $x$ is equal to the valence of the metal $M''$, a titanium halide having the formula $TiX_4$, wherein X is chlorine or bromine, and an inorganic halide having the formula $M'''I_b$, wherein $M'''$ is beryllium, zinc, cadmium, aluminum, gallium, indium, thallium, silicon, germanium, tin, lead, phosphorus, antimony, arsenic and bismuth, and $b$ is an integer from 2 to 5, inclusive, (5) a catalyst comprising an organo compound having the formula $R'_xM''$, wherein $R'$, $M''$ and $x$ are as defined above, titanium tetraiodide, and an inorganic halide having the formula $M^{iv}X_c$, wherein $M^{iv}$ is aluminum, gallium, indium, thallium, germanium, tin, lead, phosphorus, antimony, arsenic and bismuth, X is chlorine or bromine and $c$ is an integer from 2 to 5, inclusive, and (6) a catalyst comprising $R''_nM'''$ or $R''_2AlH$ where $R''$ is alkyl, alkenyl, cycloalkyl, cycloalkenyl, and aryl, $M'''$ is a metal selected from the group consisting of magnesium and aluminum, and $n$ is an integer equal to the valence of $M'''$, titanium tetrachloride and/or titanium tetrabromide, and ta least one iodohydrocarbon represented by the formula $C_aI_bH_cX_d$ wherein $a$ is an integer of 1 to 20, inclusive, $b$ is an integer from 1 to 6, inclusive, $c$ is an integer from 0 to 41, inclusive, $d$ is an integer from 0 to 6, inclusive, and X is a halogen other than iodine, at least one iodine atom in said iodohydrocarbon being chemically bound to a carbon each of whose linkages to another atom is by a single bond, i.e., to a carbon atom which is not joined to another carbon atom by a double or triple bond and is not a member of an aromatic ring. The R′ and R″ radicals have up to and including 20 carbon atoms. Catalyst (3) described above is the preferred type which is employed in this invention and reference is made to copending application Ser. No. 844,651, filed Oct. 6, 1959, by Robert P. Zelinski, for a detailed description thereof. In using this type of catalyst, I prefer to use a mixture of triisobutylaluminum, titanium tetrachloride, and elemental iodine.

The following are examples of preferred catalyst systems which can be used to polymerize 1,3-butadiene to a high cis-1,4-polybutadiene:

triisobutylaluminum and titanium tetraiodide;
triethylaluminum and titanium tetraiodide;
triisobutylaluminum, titanium tetrachloride and titanium tetraiodide;
triethylaluminum, titanium tetrachloride and titanium tetraiodide;
diethylzinc and titanium tetraiodide;
dibutylmercury and titanium tetraiodide;
triisobutylaluminum, titanium tetrachloride and iodine;
triethylaluminum, titanium tetrabromide and iodine;
n-amylsodium and titanium tetraiodide;
phenylsodium and titanium tetraiodide;
n-butylpotassium and titanium tetraiodide;
phenylpotassium and titanium tetraiodide;
n-amylsodium, titanium tetrachloride and titanium tetraiodide;
triphenylaluminum and titanium tetraiodide;
triphenylaluminum, titanium tetraiodide and titanium tetrachloride;
triphenylaluminum, titanium tetrachloride and iodine;
tri-alpha-naphthylaluminum, titanium tetrachloride and iodine;
tribenzylaluminum, titanium tetrabromide and iodine;
diphenylzinc and titanium tetraiodide;
di-2-tolylmercury and titanium tetraiodide;
tricyclohexylaluminum, titanium tetrachloride and titanium tetraiodide;
ethylcyclopentylzinc and titanium tetraiodide;
tri(3-isobutylcyclohexyl)aluminum and titanium tetraiodide;
tetraethyllead, titanium tetrachloride and titanium tetraiodide;
dimethylphenyllead, titanium tetrachloride and titanium tetraiodide;
diphenylmagnesium and titanium tetraiodide;
di-n-propylmagnesium, titanium tetrachloride and titanium tetraiodide;
dimethylmagnesium, titanium tetrachloride and iodine;
diphenylmagnesium, titanium tetrabromide and iodine;
methylethylmagnesium and titanium tetraiodide;
dibutylberyllium and titanium tetradiodide;
diethylcadmium and titanium tetraiodide;
diisopropylcadmium and titanium tetraiodide;
triisobutylaluminum, titanium tetrachloride, and antimony triiodide;
triisobutylaluminum, titanium tetrachloride and aluminum triiodide;
triisobutylaluminum, titanium tetrabromide, and aluminum triiodide;
triethylaluminum, titanium tetrachloride, and phosphorus triiodide;
tri-n-dodecylaluminum, titanium tetrachloride, and tin tetraiodide;
triethylgallium, titanium tetrabromide, and aluminum triiodide;
tri-n-butylaluminum, titanium tetrachloride, and antimony triiodide;
tricyclopentylaluminum, titanium tetrachloride, and silicon tetraiodide;
triphenylaluminum, titanium tetrachloride, and gallium triiodide;
triisobutylaluminum, titanium tetraiodide and tin tetrachloride;
triisobutylaluminum, titanium tetraiodide and antimony trichloride;
triisobutylaluminum, titanium tetraiodide and aluminum trichloride;
triisobutylaluminum, titanium tetraiodide, and tin tetrabromide;
triethylgallium, titanium tetraiodide, and aluminum tribromide;
triethylaluminum, titanium tetraiodide, and arsenic trichloride;
tribenzylaluminum, titanium tetraiodide, and germanium tetrachloride;
triisobutylaluminum, titanium tetrachloride and isobutyl iodide;
triisobutylaluminum, titanium tetrachloride and iodoform;
triisobutylaluminum, titanium tetrachloride and diphenyl iodonium iodide;
triethylaluminum, titanium tetrabromide and benzyl iodide;
di-n-hexylaluminum hydride, titanium tetrachloride and n-propyl iodide;
diphenylmagnesium, titanium tetrachloride and cyclohexyl iodide;
diethyl magnesium, titanium tetrabromide and methyl iodide; and the like.

The amount of the catalyst used in preparing the high cis-polybutadiene product can vary over a rather wide range. The amount of the organometal used in the catalyst composition is usually in the range of 1.0 to 20 mols per mol of the halogen-containing component, i.e., a metal halide with or without a second metal halide, elemental iodine, or an iodohydrocarbon. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodide, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted.

The process for preparing high-cis-polybutadiene can be carried out at temperatures varying over a rather wide range e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

The present invention is also applicable to the process for polymerizing 1,3-butadiene with an organolithium compound. The polybutadienes prepared with an organolithium catalyst generally contain from 35 to 48 percent cis-1,4-addition, from 45 to 55 percent trans-1,4-addition, and from 6 to 10 percent vinyl 1,2-addition. The present invention is particularly applicable to low inherent viscosity polybutadienes prepared by this method. Such polymers generally have an inherent viscosity in the range of 0.75 to 3. While the low inherent viscosity polybutadienes possess outstanding properties, they have a tendency to cold flow when in the unvulcanized state.

Organolithium compounds suitable for use in the polymerization have the formula $R'''Li_x$, wherein $R'''$ is a hydrocarbon radical selected from the group consisting of aliphatic, cycloaliphatic and aromatic radicals and $x$ is an integer from 1 to 4, inclusive. The $R'''$ in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium,
iso-propyllithium,
tert-octyllithium,
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithiocyclohexane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,-15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane,
1,2,3,5,-tetralithio-4-hexylanthracene,
and the like.

The process used in preparing the organolithium-catalyzed polybutadiene can be conducted at a temperature in the range of −100 to 250° F., preferably at a temperature in the range of 0 to 180° F. The polymerization reaction can be carried out under autogeneous pressures. It is usually desirable to operate at a pressure sufficient to maintain the reaction mixture in the liquid phase. The polymerization is conducted in the presence of a hydrocarbon diluent like that employed in the high-cis-polybutadiene polymerization process as described hereinbefore. The actual pressure used in the process will depend upon the particular diluent employed and the temperature at which the polymerization is to be conducted.

A polybutadiene having a desired inherent viscosity can be readily prepared by varying the concentration of the organolithium compound. For example, with a completely dry system and no other impurities present to destroy the organolithium compound, about 2.5 millimoles of effective catalyst per 100 grams of monomer (mhm.) is generally required to give a polymer having an inherent viscosity of 0.75, and about 0.3 millimole of effective catalyst per 100 grams of monomer is generally required for the production of a polymer having an inherent viscosity of 3.0. It has been found that for practical operations approximately 0.3 mhm. or more of catalyst is needed as a scavenger for the system.

The objects and advantages of this invention are further illustrated by the following examples, but it should be understood that the various materials, amounts, temperatures, and other details recited in these examples, should not be construed to limit this invention unduly.

The microstructure of each cis-polybutadiene referred to in the examples is determined by dissolving a sample of the polymer in carbon disulfide so as to form a solution having 25 grams of polymer per liter of solution. The infrared spectrum of the solution (percent transmission) is then determined in a commercial infrared spectrophotometer.

The percent of the total unsaturation present as trans-1,4- is calculated according to the following equation and consistent units: $\epsilon = E/tc$, where $\epsilon$=extinction coefficient liters-mols$^{-1}$-centimeters$^{-1}$); $E$=extinction (log $I_0/I$); $t$=path length (centimeters); and $c$=concentration (mols double bond/liter). The extinction is determined at the 10.35 micron band and the extinction coefficient is 146, 129.8, or 132.6 (liters-mols$^{-1}$-centimeters$^{-1}$) depending on the spectrophotometer and/or cell used.

The percent of the total unsaturation present as 1,2- (or vinyl) is calculated according to the above equation, using the 11.0 micron band and the extinction coefficient is 209 or 182.1 (liters-mols$^{-1}$-centimeters$^{-1}$) depending on the spectrophotometer and/or cell used.

The percent of the total unsaturation present as cis-1,4- is obtained by subtracting the trans-1,4- and 1,2- (vinyl) determined according to the above procedure from the theoretical unsaturation, assuming one double bond per each $C_4$ unit in the polymer.

The cold flow values are determined by extruding the rubber through a ¼ inch orifice at 3.5 p.s.i. pressure and a temperature of 50° C. (122° F.). After allowing 10 minutes to reach steady state, the rate of extrusion was measured and the values reported in milligrams per minute (mg./min.).

*Example I*

1,3-butadiene was batch polymerized at 41° F. for 20 hrs. using the recipe of Table I.

TABLE I

| | Parts by wt. |
|---|---|
| 1,3-butadiene | 100 |
| Toluene | 1000 |
| Triisobutylaluminum | 0.51 |
| Iodine | 0.19 |
| Titanium tetrachloride | 0.08 |

Portions of the polymerization mixture at the end of the 20 hrs. (and 95% conversion) were treated with various treating agents (in toluene) of this invention and allowed to stand for 22 hrs. at room temperature, after which the treated mixtures were shortstopped with a 50–50 mixture of toluene and isopropanol containing 10% of OA-2246, a commercial antioxidant identified as 2,2′-methylene - bis(4 - methyl - 6 - tert - butylphenol). After this shortstopping, the high-cis-polybutadiene products were recovered and evaluated for cold flow. For purposes of comparison, a control portion of the polymerization mixture was not treated with a treating agent of this invention but merely shortstopped and allowed to stand at room temperature for 22 hrs. before recovery of the polymer. A summary of these runs and results obtained are set forth in Table II.

TABLE II

| Run | Treating agent | Cold flow, mg./min. |
|---|---|---|
| 1 | None (control) | 11.8 |
| 2 | 1.12 phr. of diisobutylaluminum hydride | 2.3 |
| 3 | 1.50 phr. of diisobutylaluminum hydride | 0.1 |
| 4 | 0.90 phr. of diethylaluminum hydride and 2.40 phr. of triethylaluminum. | 1.5 |

*Example II*

1,3-butadiene was batch polymerized at 41° F. for 19 hrs. using said recipe of Table I. Following polymerization, portions of the polymerization mixture were treated with diisobutylaluminum hydride according to the practice of this invention and allowed to age for certain periods at 158° F., after which the treated mixtures were shortstopped as in Example I and the high-cis-polybutadiene polymers recovered and evaluated for cold flow. For purpose of comparison, a control portion of the polymerization mixture was merely shortstopped and the polymer recovered without aging and evaluated. A summary of these runs and the results obtained are set forth in Table III.

TABLE III

| Run | Amt. of diisobutylaluminum hydride, phr. | Aging period, hrs. | Cold flow, mg./min. |
|---|---|---|---|
| 1 | None (control) | 0 | 8.9 |
| 2 | 0.71 | 0 | 1.4 |
| 3 | 0.71 | 0.5 | 1.0 |
| 4 | 0.71 | 1.0 | 1.5 |
| 5 | 0.71 | 2.0 | 0.9 |
| 6 | 0.71 | 6.0 | 2.3 |

*Example III*

1,3-butadiene was batch polymerized at 41° F. for 20 hrs. using the recipe of Table IV to obtain high-cis-polybutadiene at quantitative conversion.

TABLE IV

| | Parts by wt. |
|---|---|
| 1,3-butadiene | 100 |
| Toluene | 1000 |
| Triisobutylaluminum | 0.51 |
| Iodine | 0.19 |
| Titanium tetrachloride | 0.08 |

Following polymerization, portions of the polymerization mixture were treated with diisobutylaluminum hydride according to the practice of this invention and allowed to age for various periods at elevated temperatures, after which the treated mixtures were shortstopped as in Example I and the butadiene polymers recovered and evaluated for cold flow along with a control run. A summary of these runs and the results obtained are set forth in Table V.

TABLE V

| Run | Amt. of diisobutylaluminum hydride, phr. | Time, min. | Temp., °F. | Cold flow, mg./min. |
|---|---|---|---|---|
| 1 | None (control) | 0 | | 4.0 |
| 2 | 1.42 | 5 | 183 | 0.92 |
| 3 | 1.42 | 15 | 182 | 1.0 |
| 4 | 1.42 | 30 | 185 | 0.68 |
| 5 | 1.42 | 45 | 190 | 0.36 |
| 6 | 1.42 | 60 | 195 | 0.37 |
| 7 | 1.42 | 150 | 200 | 0.26 |
| 8 | 1.42 | 210 | 200 | 0.02 |

*Example IV*

1,3-butadiene was batch polymerized at 41° F. for 24 hrs, using the recipe of Table VI to obtain 100% conversion of the butadiene to a polybutadiene polymer.

TABLE VI

| | Parts by wt. |
|---|---|
| 1,3-butadiene | 100 |
| Toluene | 1000 |
| Triisobutylaluminum | 0.48 |
| Iodine | 0.18 |
| Titainium tetrachloride | 0.076 |

Following polymerization, 1.42 phr. of dissobutylaluminum hydride was added to the polymerization mixture and the treated mixture was aged for 24 hrs. at 122° F., after which the mixture was shortstopped with 1 phr. of AO–2246 added as a 10% solution in toluene and the butadiene polymer was coagulated with an equal volume of isopropanol in a Waring Blendor. The recovered cispolybutadiene had a cold flow of 0.4 mg./min., a Mooney viscosity (ML–4) of 48.0, an inherent viscosity of 2.54, zero % gel, and a microstructure of 93.7% cis, 2.9% trans, and 3.4% vinyl.

*Example V*

Portions of a butadiene polymerization mixture prepared like that of Example IV were treated with various treating agents of this invention and aged at 122° F., after which the polymer was coagulated and recovered and its cold flow properties evaluated. For purposes of comparison, portions of these mixtures were coagulated, and recovered and evaluated without treating and aging the same with the treating agent of this invention. A summary of these runs and results obtained are set forth in Table VII.

TABLE VII

| Run | Amt. of treating agent, phr. | Cold flow, mg./min. | |
|---|---|---|---|
| | | Prior to treatment | One day after treatment |
| 1 | 3.96 triisobutylaluminum | 3.9 | 1.4 |
| 2 | 9.90 triisobutylaluminum | 3.5 | 0.2 |
| 3 | 22.50 tri-n-decylaluminum | 5.3 | 1.4 |
| 4 | 0.71 diisobutylaluminum hydride | 3.8 | 1.5 |
| 5 | 1.42 diisobutylaluminum hydride | 4.8 | 0.2 |

*Example VI*

1,3-butadiene was batch polymerized using n-butyllithium as a catalyst to prepare a first batch of polybutadiene having 57% vinyl configuration and a second bath containing 7% vinyl configuration. Portions of these polymers were dissolved in toluene and treated with diisobutylaluminum hydride and aged at 122° F. for 20 hrs. A summary of these runs and the results obtained are set forth in Table VIII.

TABLE VIII

| Run | Polymer batch | Amt. of diisobutyl aluminum hydride, phr. | Cold flow, mg./min. |
|---|---|---|---|
| 1 | Polymer with 57% vinyl | 0 | (¹) |
| 2 | do | 1.42 | 204 |
| 3 | do | 2.84 | 69 |
| 4 | do | 7.10 | 0.2 |
| 5 | Polymer with 7% vinyl | 0 | 45 |
| 6 | do | 1.42 | 17 |
| 7 | do | 2.84 | 0.5 |
| 8 | do | 7.10 | 0 |

¹ Too soft to measure.

The above-described examples clearly demonstrate that significant reduction of butadiene polymer's tendency to cold flow can be obtained by treating polymerization mixtures of the same with the treating agents of this invention.

Various modifications and alterations of this invention will become apparent to those skilled in the art without departing from the scope and spirit of this invention, and it should be understood that this invention is not to be limited unduly to that set forth herein for illustrative purposes.

I claim:

1. In a process wherein 1,3-butadiene is polymerized to polybutadiene polymer having a cis-1,4-content of at least 80 percent, the improvement comprising adding to the polymerization mixture containing said polymer, after at least 80 percent of the monomer has been converted to polymer, a treating agent having the general formula $R_nMH_m$, where R is a hydrocarbon radical selected from the group consisting of alkyl, cycloalkyl, and aryl radicals and combinations thereof, M is a metal selected from the group consisting of boron, aluminum, gallium, indium and thallium metal, H is hydrogen, $n$ is an integer from 1 to 3, $m$ is an integer from 0 to 2, and the sum of $n$ and $m$ is 3, continuing the polymerization at an elevated temperature in the range of 40–300° F. for a period of time sufficient to age said treated mixture and recovering said polymer from the treated polymerization mixture.

2. The process according to claim 1, wherein said M is aluminum.

3. The process according to claim 1, wherein said treating agent is diisobutylaluminum hydride.

4. The process according to claim 1, wherein said treating agent is triethylaluminum.

5. The process according to claim 1, wherein said treating agent is diethylaluminum hydride.

6. The process according to claim 1, wherein said treating agent is triisobutylaluminum.

7. The process according to claim 1, wherein said treating agent is tri-n-decylaluminum.

8. The process according to claim 3, wherein said polybutadiene polymer is prepared by polymerization of 1,3-butadiene with an organolithium catalyst.

9. In a process wherein 1,3-butadiene is polymerized in the presence of toluene and a catalyst comprising that obtained upon commingling triisobutylaluminum, iodine, and titanium tetrachloride to form a polymerization mixture containing polybutadiene polymer, the improvement comprising treating said polymerization mixture, after at least 80 percent of the 1,3-butadiene has been converted to polymer, with diisobutylaluminum hydride, continuing the polymerization at an elevated temperature in the range of 40–300° F. for a period of time sufficient to age said treated mixture and recovering polybutadiene polymer from the resulting treated polymerization mixture, the recovered polymer having little, if any, tendency to cold flow.

References Cited by the Examiner

UNITED STATES PATENTS

| | | | |
|---|---|---|---|
| 2,943,063 | 6/1960 | Eby et al. | 260—94.9 |
| 3,094,514 | 6/1963 | Tucker | 260—94.7 |
| 3,172,881 | 3/1965 | Farrar et al. | 260—94.7 |
| 3,211,710 | 10/1965 | Hendriks et al. | 260—94.7 |

JOSEPH L. SCHOFER, *Primary Examiner.*

C. R. REAP. H. I. CANTOR. *Assistant Examiners.*